(No Model.)

H. FRANZ.
TOOL FOR FLARING AND CRIMPING GLASSWARE.

No. 416,099. Patented Nov. 26, 1889.

WITNESSES:
Danun S. Wolcott
F. E. Gaither

INVENTOR,
Henry Franz
by George H. Christy
Att'y.

United States Patent Office.

HENRY FRANZ, OF PITTSBURG, PENNSYLVANIA, ASSIGNOR TO THE THOMAS EVANS COMPANY, OF SAME PLACE.

TOOL FOR FLARING AND CRIMPING GLASSWARE.

SPECIFICATION forming part of Letters Patent No. 416,099, dated November 26, 1889.

Application filed August 30, 1889. Serial No. 322,410. (No model.)

*To all whom it may concern:*

Be it known that I, HENRY FRANZ, a citizen of the United States, residing at Pittsburg, in the county of Allegheny and State of Pennsylvania, have invented or discovered certain new and useful Improvements in Tools for Flaring and Crimping Glassware, of which improvements the following is a specification.

Figure 1:
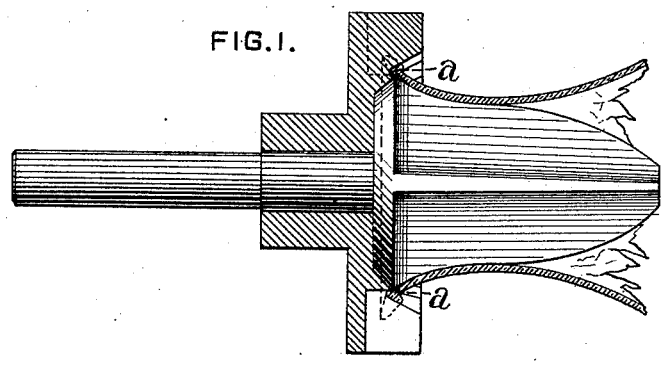

The invention described herein relates to certain improvements in tools for flaring, shaping, and crimping the edges of glass articles. In tools of this class as heretofore constructed the operative edges of the crimper lay wholly outside of the flaring-tool, the disk forming the base of the flaring-tool, as well as the ribs thereof, being wholly within the crimping-edges, as shown in Fig. 1, the two parts of the tool operating wholly independently of each other. As a result of this lack of conjoint action at the same time and on the same part, the enamel on the parts of the glass folded back, as at *a*, Figure 1, is cracked in said operation, and these cracks are rapidly developed by the expansion and contraction of the glass while in use; and, further, it has been impossible to form the edges of the articles into any other shape than that of a true circle.

The object of this invention is to provide for the simultaneous operation of both tools or parts thereof on the same parts of the article.

The invention claimed is hereinafter more fully described.

Figure 2:
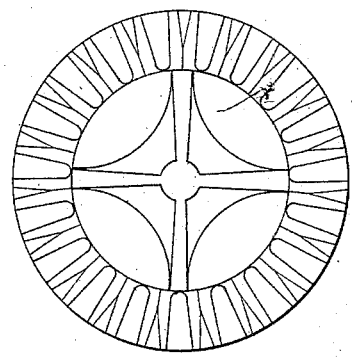
Figure 3:
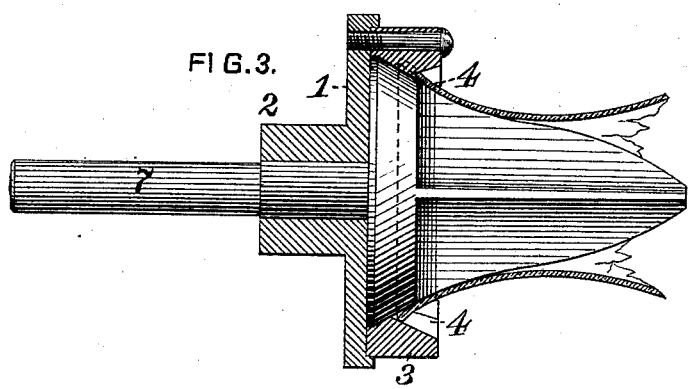
Figure 4:
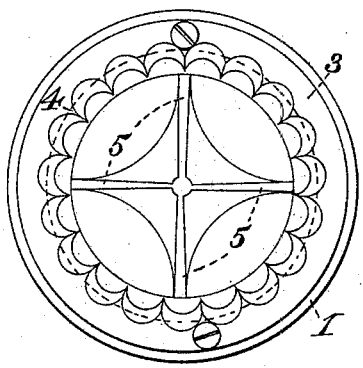
Figure 5:
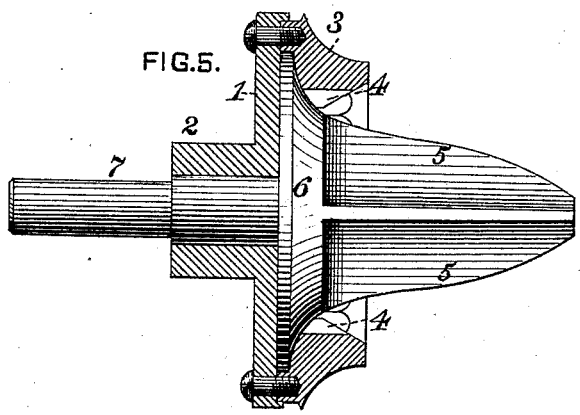
Figure 6:
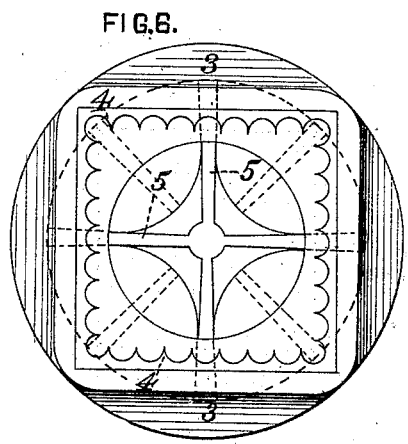

In the accompanying drawings, forming a part of this specification, Figure 1 is a sectional view of a flaring and crimping tool as at present constructed. Fig. 2 is a plan view of the same. Figs. 3 and 4 are sectional and plan views of my improved tool, and Figs. 5 and 6 are similar views of a modified shape of the tool.

Onto the disk 1, which is provided with a boss 2 on its rear side, is secured a ring 3, and in the inner periphery of the ring is cut a series of scallops, thus forming a series of indenting-edges 4.

The flaring-tool consists of two or more radial ribs 5, cone-shaped as to their outer edges and formed integral with each other and with the base-plate 6. This plate is made at or near its point of junction with the ribs of a diameter less than the internal diameter of the crimping-ring, measuring from the apices of the indenting-edges 4, and gradually increases in diameter toward its lower end, where the plate has a diameter greater than the inner diameter of the crimping-ring, measuring from the bottoms of the recesses or scallops formed therein—that is to say, the plate flares outwardly from its upper side, the surface of the perimeter being either straight or curved, as shown in Figs. 3 and 5, and projects under and somewhat beyond the indenting-edges of the crimping-ring, which is undercut or recessed on its inner face for the reception of the plate, as shown. The plate 6 is provided on its rear side with a stem 7, passing through an opening in the disk 1 and boss 2, which serve as a bearing therefor.

This tool is mounted, as is customary, so that the plate 6 and radial ribs may be rotated and the crimping-ring held stationary, or the flaring part of the tool may be held stationary and crimping portion rotated; but in the latter case provision must be made for rotating the glass article at the same speed as the crimping-ring.

As the chimney or other article is pressed over the flaring-tool, the ribs or wings 5 will, in their rotation, impart the desired shape to said article, whose edges will, as the article is pressed down, be indented by the edges 5. During this indentation of the edges the outer perimeter of the plate 6 will, in its rotation under the edges, prevent the formation of a bead on the inner surface of the articles and along the edges of the projections formed thereon by the crimper, the material which otherwise would form such bead being pressed by the action of the plate into the scallops of the crimper.

In the old form of tool shown no other shape than circular could be given to the article; but by extending the plate outwardly, as shown, the glass is pressed or swept outward by the action of the moving surface of the plate, and caused to conform to the inner contour of the ring as well as the scallops, as shown in Fig. 3.

In lieu of a continuous surface extending out and underlying the operative or shaping portions of the ring 3, the ribs or wings 5 may be extended out to and under the shaping portion of the ring 3, and intermediate supplemental ribs or wings may be employed, as indicated in dotted lines in Fig. 6.

While preferring to form the crimper with a series of recesses or scallops, as shown in Figs. 4 and 6, as insuring a uniformity in the shape and size of the ornamentation on the edges of the article, the crimper may be constructed in the usual manner, as shown in Fig. 2.

It will be obvious to those skilled in the art that the tool hereinbefore described may be employed for imparting an irregular shape—i. e., other than circular—to the ends of glass articles, whether the edges are to be crimped or not.

I claim herein as my invention—

1. The combination of an external shaping-ring, a flaring-tool, a portion thereof extending outwardly under the shaping-ring, one of said parts being capable of rotation, substantially as set forth.

2. The combination of an external shaping-ring provided with a series of indenting-edges and a flaring-tool, a portion thereof extending outwardly under the indenting-edges of the shaping-ring, one of said parts being capable of rotation, substantially as set forth.

3. The combination of an external shaping-ring having a series of recesses or scallops formed in its inner wall, and a flaring-tool having radial ribs and a base-plate extending outwardly under the shaping-ring, one of said parts being capable of rotation, substantially as set forth.

In testimony whereof I have hereunto set my hand.

HENRY FRANZ.

Witnesses:
 DARWIN S. WOLCOTT,
 J. L. RALPH.